(12) United States Patent
Dircks et al.

(10) Patent No.: US 6,542,994 B1
(45) Date of Patent: Apr. 1, 2003

(54) LOGON AUTHENTICATION AND SECURITY SYSTEM AND METHOD

(75) Inventors: Charles E. Dircks, Frankfort, IN (US); Eric E. Osmann, Evergreen, CO (US)

(73) Assignee: Pinnacle Technologies, Inc., Indianapolis, IN (US)

(*) Notice: Subject to any disclaimer, the term of this patent is extended or adjusted under 35 U.S.C. 154(b) by 0 days.

(21) Appl. No.: 09/290,114

(22) Filed: Apr. 12, 1999

(51) Int. Cl.$^7$ ................................................. G06F 11/00
(52) U.S. Cl. ........................................ 713/201; 713/200
(58) Field of Search ................................ 713/200, 201, 713/202, 1, 2

(56) References Cited

U.S. PATENT DOCUMENTS

| | | | |
|---|---|---|---|
| 5,023,907 A | 6/1991 | Johnson et al. | 380/4 |
| 5,297,032 A | 3/1994 | Trojan et al. | 364/408 |
| 5,315,657 A | 5/1994 | Abadi et al. | 380/25 |

(List continued on next page.)

FOREIGN PATENT DOCUMENTS

| | | |
|---|---|---|
| EP | 0 422 839 A2 | 1/1991 |
| EP | 0 561 509 A1 | 2/1993 |
| WO | WO97/15008 | 4/1997 |

OTHER PUBLICATIONS

Administration of Graphic User Interface and Multimedia Objects Using Cooperative Processing. IBM Technical Disclosure Bulletin, vol. 37, No. 9, Sep. 1, 1994, pp. 675–678, XP000475542.

Cripe B E et al: "A Common Desktop Environment For Platforms Based on the Unix Operating System" vol. 47, No. 2, Apr. 1, 1996, pp. 6–14, XP000591784.

"Graphical Operations" IBM Technical Disclosure Bulletin, vol. 38, No. 5, May 1, 1995, pp. 591–593, XP000519693.

International Search Report PCT/US97/08065.

Primary Examiner—Ly V. Hua
(74) Attorney, Agent, or Firm—Baker & Daniels

(57) ABSTRACT

The present invention involves a desktop administration system and method which allows a network administrator to remotely create, protect, and manage desktops and control file systems across a network. The invention provides security software, a PDF and Daemon, which is installed as the primary Registry process. Upon starting of the workstation, the security software mask off any other interrupt or process and complete an authentication procedure while creating an electronic trail for operating system to continue operation as if the security software did not preempt the operating system. The PDF receives desktop information from the network server and builds a desktop which the user manipulates to invoke local and/or network programs and access local and/or network utilities, providing appropriate keys or other authentication information to access restricted network resources. The Daemon serves as an interface for the PDF by channeling any communication to or from the user or the network, preventing unauthorized transactions at either the workstation or network level. The PDF provides a graphic user interface using objects that encapsulate programs with data, such as user preferences, default directories, and access privileges. The Daemon performs many tasks, including starting the PDF, enumerating the windows of the graphic user interface, and recording operations.

30 Claims, 2 Drawing Sheets

Microfiche Appendix Included
(5 Microfiche, 233 Pages)

U.S. PATENT DOCUMENTS

| | | |
|---|---|---|
| 5,349,643 A | 9/1994 | Cox et al. .................... 380/25 |
| 5,369,778 A | 11/1994 | San Soucie et al. ........ 395/800 |
| 5,375,244 A | 12/1994 | McNair ...................... 395/725 |
| 5,379,432 A | 1/1995 | Orton et al. ................ 395/700 |
| 5,381,534 A | 1/1995 | Shi ............................ 395/200 |
| 5,455,953 A | 10/1995 | Russell ...................... 395/739 |
| 5,469,556 A | 11/1995 | Clifton ...................... 395/490 |
| 5,475,625 A | 12/1995 | Glaschick .................. 395/600 |
| 5,481,715 A | 1/1996 | Hamilton et al. ........... 395/700 |
| 5,553,239 A | 9/1996 | Heath et al. ........... 395/187.01 |
| 5,604,490 A | 2/1997 | Blakley, III et al. .... 340/825.31 |
| 5,678,041 A | 10/1997 | Baker et al. ................ 395/609 |
| 5,696,898 A | 12/1997 | Baker et al. ........... 395/187.01 |
| 5,774,650 A | 6/1998 | Chapman et al. .......... 395/186 |
| 6,189,105 B1 * | 2/2001 | Lopes ........................ 713/202 |
| 6,449,652 B1 * | 9/2002 | Blumenau et al. .......... 709/229 |

\* cited by examiner

LOGON AUTHENTICATION AND SECURITY SYSTEM AND METHOD

MICROFICHE APPENDIX

This application includes a microfiche appendix having 5 sheets and 233 frames. A portion of the disclosure of this patent document contains material which is the subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to personal computer software which requires the user to logon. More specifically, the field of the invention is that of security system software for authenticating users of a personal computer.

2. Description of the Related Art

Security for personal computers is becoming an issue of greater importance to computer users. Whether the objective is to prevent unauthorized access to network resources or to prevent alteration of data stored by the personal computer, known operating systems conventionally have a user logon screen which appears to the user as the first action of the operating system, prompting the user to enter a user name and password. In fact, many known operating systems perform many functions before the appearance of the logon screen. Although the logon screen appears to require both the user name and password, the operating system often does not require those items for security purposes. Rather, the user name and password are used to determine whether personalized software configuration settings or a default configuration are imposed, and often such a logon window may be augmented or replaced by other software. The conventional operating system expects that a logon user name and password logon file, even if no values were entered in the logon window, will be stored at a predetermined location and certain features of the operating system will not operate if the logon file does not exist.

FIG. 2 shows a prior art conventional operating system initialization process. Upon power on or re-booting, Start-up 200 proceeds directly to primary Registry process step 202. In this step, the operating system is installed as the primary process in the Registry so that the operating system sequence commences. The Registry is used to maintain a list of the various processes which are concurrently executing on the computer. Conventionally, the operating system is entered as the "primary process" and has precedence over all the other processes in the multi-tasking environment. All other processes are secondary processes, and can be interrupted, terminated, or otherwise controlled by the primary process.

Logon Box step 204 involves presenting the user with authentication fields, such as for a user name and password, which the user may choose to by-pass. Logon Box step 204 also includes storing an authentication file, or a .pwl file, on the local disk storage to record the successful completion of the Logon Box process. In step 206, the operating system checks the .pwl file, and if it exists proceeds to step 208 to run the operating system. If the .pwl file is not found, then further execution of the operating system is suspended until the next power on or re-boot.

However, one potential problem with such conventional systems is the possibility of the user, through operation of the keyboard or other input device, can circumvent the initial logon sequence to avoid security or authentication procedures. With some operating systems, for example the GINA (Graphical Identification aNd Authentication) of the Windows NT operating system of Microsoft Corporation, provide a security and authorization capability that prevents the user from escaping the security and authentication procedures. However, in other conventional operating systems, such as the Windows, Windows 95, and Windows 98 operating systems of Microsoft Corporation, the user may manipulate and avoid any security or authentication procedures by using the keyboard to break out of the initial start-up functions of the operating systems. This potential problem with such conventional, non-GINA operating systems diminishes the security and authentication procedures which may be relying on the logon sequence. For example, authentication may be provided by biometric devices like fingerprint or retina scan, or smart card or other authentication technology that expects that the logon sequence is inviolate.

In order to secure the computer system, the logon sequence must be uninterruptable to allow the completion of the authentication procedures, while returning basic operations over to the control of the operating system after the logon sequence. This imposes two significant problems for programming systems that can accomplish these disparate goals. First, the logon sequence must be protected to prevent the circumvention of the authentication system. Second, the authentication device and process must allow the operating system to continue unabated. Conventional systems include difficulties in one or both of these areas.

What is needed in the art is a software system which secures non-GINA operating systems so that authentication devices cannot be overridden or ignored during the logon sequence.

SUMMARY OF THE INVENTION

The present invention is a logon authentication system and method which provides integrity and security to the logon process for a personal computer or workstation. The invention provides a methodology that allows the authentication system to maintain control of the operations of the personal computer during the authentication procedure, and allow the unimpeded operation of the logon sequence after the operation of the authentication device so that the operating system may continue operation. The invention allows these operations without altering how a user works on the desktop, or the capacities of the underlying operating system or network.

The personal computer software includes a conventional operating system lacking a GINA type logon procedure. Within the software of the personal computer, the invention operates to install the authentication software as the primary provider program on the personal computer. As the primary provider program, the software of the invention can allow many types of authentication devices to operate without allowing any outside forces to interrupt the logon process. Then the software of the invention can return control to the conventional operating system with the logon file properly stored.

The present invention, in one form, relates to a method of authenticating the identity of a computer user for a computer. The computer has an operating system which includes a registry of processes and requires a secure acknowledgment of the user on the computer. A security process is established as the primary process of the registry previous to starting or restarting the computer operating system. An authentication procedure is enabled on the computer by the security process. The security process stores a secure user acknowledgment which is acceptable to the operating system. Finally, the computer operating system can begin execution.

The present invention, in another form, is a computer system including a computer system having an operating system, an authenticating device, and a security process. The computer includes a processor and memory capable of storing instructions and data. The operating system resides on the computer and includes a registry of processes and software preventing computer operations unless a user acknowledgment is present on the computer. The authenticating device ascertains the identity of the computer user. This security process resides on the computer, and has several components. The security process establishes itself as the primary process of the registry previous to starting or restarting the operating system, enables the authenticating device, and stores a user acknowledgment which is acceptable to the operating system.

Other aspects of the invention relating to masking off interrupts previous to enabling the authenticating device. Further, a personal desktop facility program supervises the execution of the computer operating system. The authenticating device used to identify the user may be a biometric device, a smartcard device, or software allowing the user to enter a password. The authenticating device may access a file containing user information to verify the user entered password, which file may be located on a network. The creation of a secure user acknowledgment file may be accomplished by reverse engineering of the operating system encryption method, or alternatively may be accomplished by invoking a portion of the operating system.

Another aspect of the invention relates to a machine-readable program storage device for storing encoded instructions for a method of authenticating the identity of a computer user for a computer according to the foregoing method.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
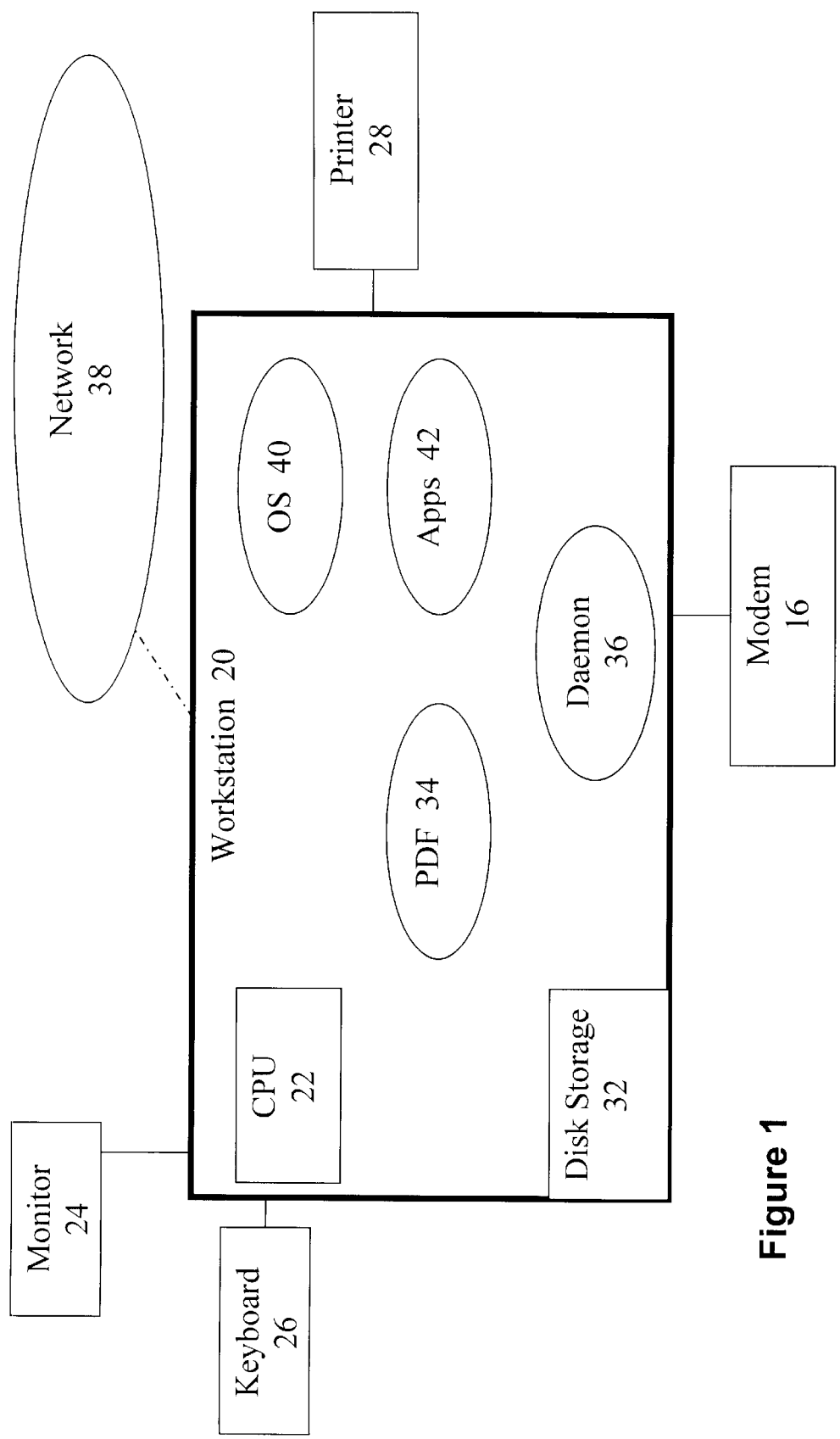
FIG. 1 is a schematic diagrammatic view of a personal computer with an authentication device using the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of algorithms and symbolic representations of operations on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical signals.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

In the following description, several terms which are used frequently have specialized meanings in the present context.

The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provides a user a desktop programming interface, and provide a user interface to a computer network allowing access to network resources, such as shared data files, common peripheral devices, and inter-workstation communication. Users activate computer programs or network resources to create "processes" which include both the general operation of the computer program along with specific operating characteristics determined by input variables and its environment.

The terms "desktop", "personal desktop facility", and "PDF" mean a specific user interface which presents a menu or display of objects with associated settings for the user associated with the desktop, personal desktop facility, or PDF. The term "Daemon" refers to a program which is not necessarily apparent to the user, but which is responsible for transmitting messages between the PDF and the network server and for protecting and regulating the user's ability to use and modify workstation or network resources. Although the following description details such operations in terms of a graphic user interface using icons, the present invention may be practiced with text based interfaces, or even with voice or visually activated interfaces.

A workstation with an authentication device is shown in block diagram form in FIG. 1, showing the general orientation and arrangement of the software operating on the computer equipment, including the authentication device administration, the workstation PDF, and the Daemon software. Workstation 20 includes CPU 22 with monitor 24 and keyboard 26, such as a standard personal computer (e.g., an IBM-PC type or Macintosh) or an advanced computer (e.g., a Next or SPARC workstation), and may include its own peripheral devices such as local printer 28, local modem 30, or local disk storage 32. With the present invention, workstation 20 includes PDF 34 and Daemon 36. PDF 34 provides a graphic user interface, or "desktop", to the programs and resources available on its workstation 20 and generally through network 38, if connected. Daemon 36 serves as an intermediary between network 38 and PDF 34, filtering out unauthorized activities and maintaining the integrity of the desktop. Network 38 may include a program such as ADMIN, not shown, which only accepts requests and receives messages from Daemon 36, so PDF 34 is required to access information and programs through Daemon 36, and must send all of its information to ADMIN through Daemon 36. Further, PDF 34 may only change the parameters of the desktop through Daemon 36, and Daemon 36 determines what operations are permissible based on criteria supplied from ADMIN. Daemon 36 includes both an initiation routine and a periodic checking routine to implement these functions. Workstation 20 also includes operating system 40 and applications programs 42.

In accordance with the present invention, disk 32 or a server on network 38 stores a .sec file (the logical designation of the sec file may include several separate physical files which are interrelated through logical connections). ADMIN software uses the information contained in the sec file to specify the menu of computer programs and network resources which may be referenced by the desktops of the users of network 20. The sec file may be a general file for all the users of network 38. Alternatively, the .sec file may represent a collection of files, which each file corresponding to a particular user or a particular class of user. Another alternative is a hybrid approach, wherein the menu information has a common component and a user specific component. In any event, this arrangement allows for a network administrator to directly manipulate sec files with ADMIN software on the network server to modify, customize, and/or maintain the desktops across a network, rather than having to change each desktop configuration locally.

Figure 3:
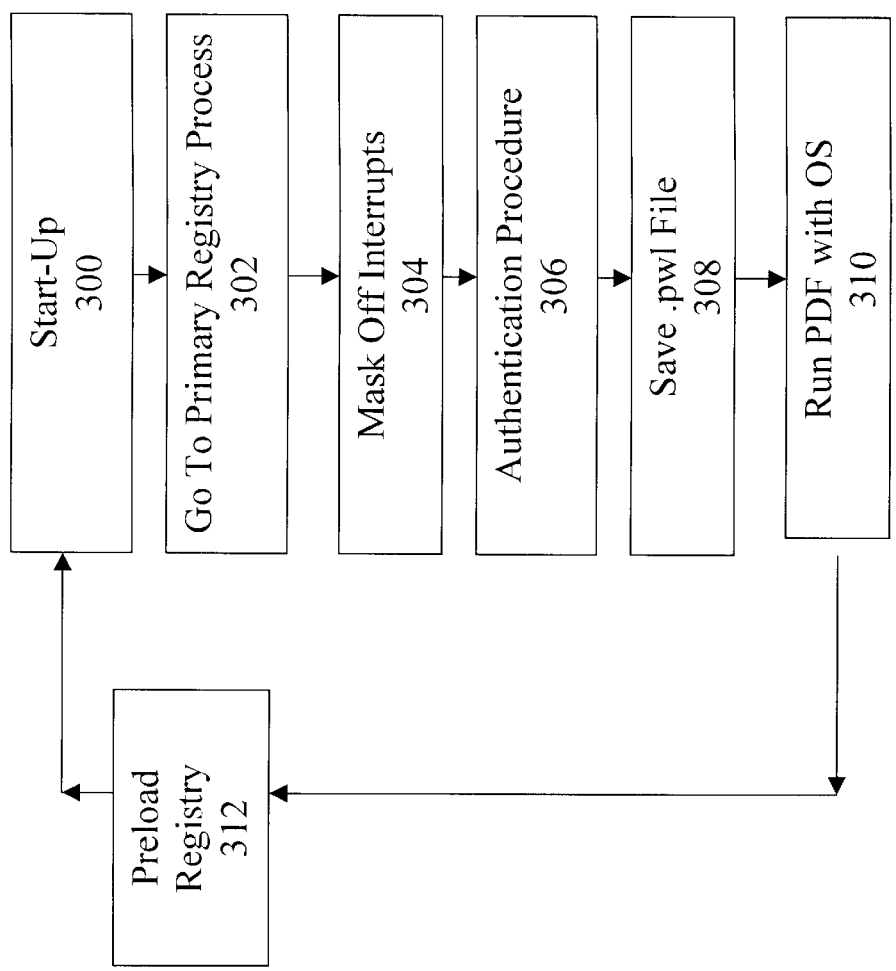
FIG. 3 is a flow chart diagram of the operation of the initialization sequence of the present invention.
Figure 2:
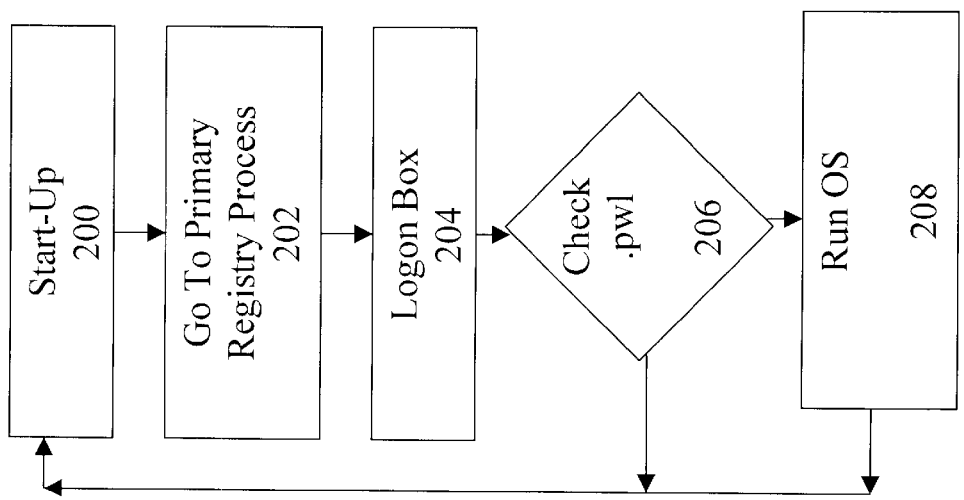
FIG. 2 is a flow chart diagram of the operation of the prior art initialization sequence.

The operation of the present invention is shown diagrammatically in FIG. 3. Start-Up 300 represent a power on or re-boot of a personal computer. With a conventional operating system, the first step of the initialization procedure involves loading the primary Registry process as in step 302. However, with the present invention, security software in the form of PDF 34 and Daemon 36 are loaded in the Registry as the primary processes. The security software then mask off interrupts in step 304 allowing for uninterrupted execution of any authentication procedure 306. Such authentication procedures may include biometric devices (finger print scanners, retina scanners, or other physical sensory apparatus directed toward the user), smart cards, or simple user name/password entry.

Once the authentication procedure is successfully completed, the security software saves a .pwl file on the local disk 32 so that conventional operation of operating system 40, for example Windows 95 or Windows 98 by Microsoft Corporation, may be started. The saving of the .pwl file may be accomplished by breaking the encryption routine of the operating system and storing such a file, or alternatively operating system 40 may have specific API's which allow the security software to store an appropriate .pwl file.

When operation of the workstation is completed and PDF 34 shuts down, one of the final steps in the process is to preload the Registry with the security software so that when the next start-up occurs, the security software is appropriately positioned so that it is the first process started by the operating system process controller. Normally, the operating system itself is the "primary process" so that the operating system controls all computer functions. However, the security software of the present invention is written to control the operating system software in such a manner that the operating system cannot distinguish the run time environment when the security software is the primary process from the run time environment when the operating system is the primary process.

The microfiche appendix contains an implementation of the present invention. The source code files in the appendix are associated with various directories. Following is a table showing the directories and the related source code description:

| Directory | Description |
|---|---|
| dsknetp | This directory contains the source code of the software implementing the algorithm of FIG. 3. |

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A machine-readable program storage device for storing encoded instructions for a method of authenticating the identity of a computer user for a computer having an operating system which includes a registry of processes and requires a secure acknowledgment of the user on the computer, said method comprising the steps of:

establishing a security process as the primary process of the registry previous to starting or restarting the computer operating system;

enabling an authentication procedure on the computer by the security process;

storing a secure user acknowledgment by the security process which is acceptable to the operating system; and executing the computer operating system.

2. The device of claim 1 wherein said method further includes the step of masking off interrupts previous to said enabling step.

3. The device of claim 1 wherein said executing step includes having a personal desktop facility program supervise the execution of the computer operating system.

4. The device of claim 1 wherein said enabling step includes enabling a biometric device to identify the user.

5. The device of claim 1 wherein said enabling step includes enabling a smartcard device to identify the user.

6. The device of claim 1 wherein said enabling step includes allowing the user to enter a password to identify the user.

7. The device of claim 6 wherein said enabling step includes accessing a file containing user information to verify the user entered password.

8. The device of claim 7 wherein said enabling step includes accessing a file on a network containing user information to verify the user entered password.

9. The device of claim 1 wherein said storing step includes creating a secure user acknowledgment file from reverse engineering of the operating system encryption method.

10. The device of claim 1 wherein said storing step includes creating a secure user acknowledgment file by invoking a portion of the operating system.

11. A computer system comprising:

a computer including a processor and memory capable of storing instructions and data;

an operating system residing on said computer, said operating system including a registry of processes, said operating system also including means for preventing computer operations unless a user acknowledgment is present on said computer;

means for authenticating the identity of a computer user of said computer; and a security process residing on said computer, said security process including means for establishing said security process as the primary process of said registry previous to starting or restarting said operating system, said security process including means for enabling said authenticating means, said security process including means for storing a user acknowledgment which is acceptable to the operating system.

12. The computer system of claim 11 wherein said security process further includes means for masking off interrupts previous to enabling said authenticating means.

13. The computer system of claim 11 further including a personal desktop facility program that supervises the execution of the computer operating system.

14. The computer system of claim 11 wherein said authenticating means includes a biometric device to identify the user.

15. The computer system of claim 11 wherein said authenticating means includes a smartcard device to identify the user.

16. The computer system of claim 11 wherein said authenticating means includes means for allowing the user to enter a password to identify the user.

17. The computer system of claim 16 wherein said authenticating means includes means for accessing a file containing user information to verify the user entered password.

18. The computer system of claim 17 wherein said authenticating means includes means for accessing a file on a network containing user information to verify the user entered password.

19. The device of claim 11 wherein said storing means includes means for creating a user acknowledgment file from reverse engineering of the operating system encryption method.

20. The computer system of claim 11 wherein said storing means includes means for creating a user acknowledgment file by invoking a portion of the operating system.

21. A method of authenticating the identity of a computer user for a computer having an operating system which includes a registry of processes and requires a secure acknowledgment of the user on the computer, said method comprising the steps of:

establishing a security process as the primary process of the registry previous to starting or restarting the computer operating system;

enabling an authentication procedure on the computer by the security process;

storing a secure user acknowledgment by the security process which is acceptable to the operating system; and executing the computer operating system.

22. The method of claim 21 further including the step of masking off interrupts previous to said enabling step.

23. The method of claim 21 wherein said executing step includes having a personal desktop facility program supervise the execution of the computer operating system.

24. The method of claim 21 wherein said enabling step includes enabling a biometric device to identify the user.

25. The method of claim 21 wherein said enabling step includes enabling a smartcard device to identify the user.

26. The method of claim 21 wherein said enabling step includes allowing the user to enter a password to identify the user.

27. The method of claim 26 wherein said enabling step includes accessing a file containing user information to verify the user entered password.

28. The method of claim 27 wherein said enabling step includes accessing a file on a network containing user information to verify the user entered password.

29. The method of claim 21 wherein said storing step includes creating a secure user acknowledgment file from reverse engineering of the operating system encryption method.

30. The method of claim 21 wherein said storing step includes creating a secure user acknowledgment file by invoking a portion of the operating system.

* * * * *

UNITED STATES PATENT AND TRADEMARK OFFICE
CERTIFICATE OF CORRECTION

PATENT NO.    : 6,542,994 B1
DATED         : April 1, 2003
INVENTOR(S)   : Dircks et al.

It is certified that error appears in the above-identified patent and that said Letters Patent is hereby corrected as shown below:

<u>Title page,</u>
Item [73], Assignee, please delete "Pinnacle Technologies, Inc. -- and substitute -- Pinnacle Tecnology, Inc. --

Signed and Sealed this

First Day of July, 2003

JAMES E. ROGAN
*Director of the United States Patent and Trademark Office*